United States Patent Office 2,982,752
Patented May 2, 1961

2,982,752
COMPOSITION COMPRISING A POLYEPOXIDE AND DIVINYLBENZENE DIOXIDE

Benjamin Phillips, Charleston, and Charles W. McGary, Jr., and Charles T. Patrick, Jr., South Charleston, W. Va., assignors to Union Carbide Corporation, a corporation of New York No Drawing. Filed Apr. 25, 1958, Ser. No. 730,804

10 Claims. (Cl. 260—31.2)

This invention relates to polyepoxide compositions. In one aspect, this invention relates to effectively reducing the viscosity of a polyglycidyl polyether of a polyhydric phenol to fit specific applications by incorporating therewith an amount of divinylbenzene dioxide, the resulting mixture upon curing exhibiting improved physical properties. In another aspect, this invention relates to curable, polymerizable compositions comprising divinylbenzene dioxide and a polyglycidyl polyether of a polyhydric phenol, and to the partially cured and cured composition resulting therefrom. In a further aspect, this invention is directed to the preparation of curable, partially cured, and cured compositions comprising divinylbenzene dioxide and a polyglycidyl polyether of a polyhydric phenol which can be modified by an active organic hardener to give a wide variety of useful properties and characteristics to said compositions.

In the synthetic resins art, it is known that specific epoxides and resins therefrom can be prepared. These epoxides include the reaction products of epichlorohydrin and dihydric phenols, and can be made into resins having special properties which fit special applications. In most cases these specific epoxides, even with additional modifications, are limited in one way or another in their applicability to only a narrow range of uses. Viscosity, for example, to a large degree limits the fields of uses of these epoxides or formulations containing these epoxides. In the manufacture of coatings, as an example, it is desirable to use coating formulations which have ranges of viscosities which are neither so low that the formulation flows off of the surface being coated nor so high that it is arduous or impossible to conveniently apply it. Even within this desirable viscosity range one or more than one segment or sub-range thereof may be particularly desirable depending upon the coating thickness required or the means to be used in applying the formulation. Illustratively, thin coatings may be obtained through the use of formulations having viscosities in the lower subranges whereas thicker coatings may be obtained by using formulations with viscosities in the higher sub-ranges. Also, if the coating is to be applied by spraying, a low viscosity formulation is preferable and when the coating is to be applied by brushing or wet lay-up procedures, a higher viscosity formulation is more useful. Similarly, the viscosities of these epoxides or formulations containing them are largely determinative of the fields of use to which they may be put, for example, in the casting, molding or bonding arts and the like. Illustratively, in casting or molding, low viscosity epoxide formulations which quickly and completely fill intricacies of molds are preferred. Low viscosity formulations capable of accepting up to large amounts of solid materials, e.g., fillers and pigments, are desirable in coating applications as well as in casting, molding or bonding applications. Other higher viscosity epoxide formulations may be wanted in bonding applications, for example, as adhesives or for manufacturing laminates. Adjustments to the epoxide or epoxide formulation viscosity, which may be possible by increasing the temperature of the epoxide or epoxide formulation, or by the addition of non-reacting solvents or reactive diluents, tend to cause additional problems in preparing, applying and curing the formulations and, in many cases, add new limitations to the physical and chemical properties of resins made from such formulations, thereby restricting their usefulness. In preparing such epoxide formulations, increases in epoxide temperatures to reduce the viscosities of said epoxides for mixing with other components, such as, hardeners, promote premature and localized curing, the expulsion of formulation components or high exothermic heat accumulations during subsequent curing which can internally damage resins. In addition, the application and curing of such epoxide formulations are made more difficult and expensive. When non-reacting solvents are employed to reduce viscosities additional procedures and costly equipment need to be employed to remove the solvent when converting the epoxide formulation to a resin. Some solvent may be entrained in the resin, or may produce bubbles which are entrained in the resin, thereby causing irregularities and weak points. Unremovable amounts of such entrained bubbles and solvent bring about defects in the physical properties, e.g., flexural strength, hardness, impact strength, heat distortion value, of resins containing them and, additionally, provide sites for attack by chemicals. Although reactive diluents may be employed to reduce viscosities, the differences of functionality, reactivity and/or volatility of the reactive diluent and the epoxide or epoxide formulation can be instrumental in causing irregularities and defects in resins made therefrom. Monofunctional diluents can cause undue shrinkage and drastic reductions in physical properties such as those previously mentioned, of resins formed from formulations containing them. Difunctional diluents of low reactivity may be, in effect, only physically entrained in resins made from formulations diluted thereby and cause reductions in resin properties. Highly reactive diluents may greatly increase the exotherms encountered when converting formulations containing them to resins. Uncontrolled exotherms can cause thermal decomposition of some formulation components as can be evidenced by charring and cause the expulsion of other components as can be evidenced by bubble formation and foaming. Volatile reactive diluents can be readily expelled from the formulations and similar to the effects of non-reactive solvents, form bubbles and foam. Other reactive diluents are extremely toxic and, hence, are not conducive to safe use in making resins.

The present invention contemplates a new class of epoxide compositions comprising divinylbenzene dioxide and a polyglycidyl polyether of a polyhydric phenol which can be stored for long periods of time, e.g., six months and longer, without appreciable increases in viscosity or other signs of polymerization. These epoxide compositions can be prepared as solids, or liquids having viscosities as low as 50 centipoises at room temperature, i.e., approximately 25° C. The viscosities of the liquid epoxide compositions of the instant invention can be controlled, as desired, without the aid of external modifications such as raising the temperature or using non-reactive solvents or reactive diluents and the like, although such modifications may be employed, if desired. These epoxide compositions can be made with the capability of accepting wide varieties of solid materials such as fillers, pigments, and the like. The liquid epoxide compositions are particularly noteworthy in being capable of accepting large amounts of solid material without at the same time entraining large amounts of air or causing damage to the solid material particles. The epoxide compositions can be cured, i.e., polymerized, by catalysts, such as, mineral acids, metal halide Lewis acids, strong bases, and the like. They can be reacted with active organic hardeners, for example, polycarboxylic acids, polyfunctional amines, polyhydric phenols and alcohols, polythiols, polycarboxylic anhydrides, and the like to provide a wide variety of useful articles. The epoxide compositions of this invention have improved pot-lives which can be controlled, as desired, to fit specific needs. Such epoxide compositions can be made so as to cure rapidly (in the presence of catalysts and/or active organic hardeners), or they are capable of storage without incurring appreciable gelation for extended periods prior to use whichever the manufacturing techniques being employed may demand. The lowest temperatures at which the epoxide compositions can be easily cured can be adjusted, as desired, and compositions having minimum curing temperatures as low as 10° to 25° C., and lower, can be made in accordance with the instant invention. The compositions can be cured to resins which are uniform and do not contain foam, entrained solvent or bubbles. Exothermic heat evolved during the curing of the compositions is within easily controllable limits, and expensive equipment or extra procedures for removing excess heat is not required, although such techniques can be employed, if desired. During the curing of the compositions very little shrinkage, if any, occurs and resinous articles having intricately molded surfaces can be manufactured therefrom.

The resins of this invention can be made as infusible products which are insoluble in most chemicals and which have remarkable resistance to attack by strong acids and bases. These resins also can be made into tough, strong products having unusual flexibility and which can be machined to a variety of shapes or polished to provide appealing finishes. In the form of coatings or laminates they are capable of tenaciously adhering to a wide variety of materials including such non-porous materials as glass and metals and have low coefficients of thermal expansion. Resins having improved flexural strengths and impact resistances can be made by the practice of the instant invention. Improved heat strengths are characteristic of resins which can be made from the compositions. Such resins are capable of supporting heavy loads at high temperatures and have heat distortion points as high as 150° C., and higher. The resins of this invention also can be made as hard articles having improved resistances to scratching and wear. They can be made in appealing colors with good color retention properties, and are useful in the manufacture of a variety of articles having decorative appearances.

Accordingly, one or more of the following objects will be achieved by the practice of this invention.

It is an object of this invention to prepare novel curable, partially cured, and cured compositions comprising divinylbenzene dioxide and a polyglycidyl polyether of a polyhydric phenol. It is another object of this invention to prepare novel epoxide compositions comprising divinylbenzene dioxide and a polyglycidyl polyether of a polyhydric phenol wherein the viscosity of said compositions can be controlled to fit particular applications by controlling the amount of divinylbenzene dioxide in said compositions. A further object of this invention is directed to accelerating the cure rate of novel compositions comprising divinylbenzene dioxide and a polyglycidyl polyether of a polyhydric phenol by incorporating therein catalytic hardeners such as the strong mineral acids, alkali metal hydroxides, metal halide Lewis acids, and the like. A yet further object of this invention is directed to the preparation of novel curable, partially cured, and cured compositions comprising divinylbenzene dioxide and a polyglycidyl polyether of a polyhydric phenol which are modified by an active organic hardener such as polyfunctional amines, polycarboxylic acids, polycarboxylic acid anhydrides, polyols, and the like to give a wide variety of useful properties and characteristics to said compositions. Numerous other objects of the present invention will become apparent to those skilled in the art from a consideration of the instant specification.

By the term "polyglycidyl polyether of a polyhydric phenol," as used herein, is meant a polyepoxide compound having terminal epoxy groups, one or more aromatic nucleus or nuclei including fused aromatic nuclei, and at least two aliphatic groups including terminal epoxy-containing aliphatic groups, the aliphatic groups being united to said aromatic nucleus or nuclei through carbon to oxygen to carbon linkages. For brevity, polyglycidyl polyether of a polyhydric phenol is also hereinafter referred to as "polyglycidyl polyether(s)." By the terms "epoxy group, epoxide or polyepoxide," as used herein, is meant a group or organic compounds which contains adjacent carbon atoms to which oxirane oxygen is attached, for example,

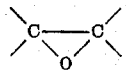

As stated previously, the broad aspect of the instant invention is directed to epoxide compositions comprising (a) divinylbenzene dioxide characterized by the following formula:

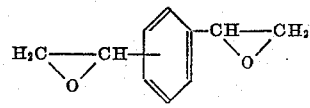

and (b) a polyglycidyl polyether of a polyhydric phenol. Any of the three isomeric forms of divinylbenzene dioxide, i.e., ortho-, meta-, or para-divinylbenzene dioxide, or mixtures thereof, can be employed as starting material for the preparation of the novel epoxide compositions of this invention. In general, the composition can contain from about 2 to about 98 weight percent of divinylbenzene dioxide, based on the total weight of divinylbenzene dioxide and polyglycidyl polyether; from about 10 to about 90 weight percent of divinylbenzene dioxide, based on the above-said total weight, is preferred.

The epoxide compositions of this invention can be prepared by mixing divinylbenzene dioxide with polyglycidyl polyethers of polyhydric phenols. It has been found advantageous to perform the mixing at a temperature which is not less than the softening point, or melting range, of the polyglycidyl polyether, although lower temperatures can be used, if desired. Mixing can be facilitated by using higher temperatures and agitation. These mixtures can be employed immediately or stored for long periods without appreciable increases in viscosity or other signs of polymerization. They can be made as homogeneous solids or homogeneous liquids which remain homogeneous and have been found not to form separate phases despite changes in temperature. Compositions having many desired viscosities can be obtained by adjusting the relative proportions of divinylbenzene dioxide and polyglycidyl polyether. Those compositions which contain a greater weight percentage of divinylbenzene dioxide have been found to have lower viscosities than the corresponding systems which contain a relatively smaller weight percentage of divinylbenzene dioxide. Viscosities of these epoxide compositions can also be controlled through the selection of polyglycidyl polyethers, such that higher viscosity compositions can be made from higher viscosity polyglycidyl polyethers and lower viscosity compositions are obtainable from lower viscosity polyglycidyl polyethers. The melting points or softening ranges of the solid compositions have been found to be lower than those of their highest melting components. In addition, the softening ranges of these solid compositions can be controlled by adjustments in the relative proportions of divinylbenzene dioxide and polyglycidyl polyethers, those compositions containing a greater weight percentage of divinylbenzene dioxide possessing lower melting points than the corresponding systems which contain a relatively smaller weight percentage of divinylbenzene dioxide.

In one embodiment of this invention the epoxide compositions (or mixtures) containing divinylbenzene dioxide and a polyglycidyl polyether of a polyhydric phenol can be admixed with a catalyst and/or an active organic hardener, both to be described hereinafter in greater detail. The resulting admixture thus is a curable composition capable of being fully cured to the solid state. These curable compositions can be heated to a temperature in the range of from about 10° to about 250° C., preferably from about 20° to about 200° C., for a period of time sufficient to produce the product desired. Should a liquid product of a particular viscosity range be desired, the operator can terminate the heating step when such viscosity range has been reached. Likewise, if thermosetting solids (intermediate reaction products) or hard or infusible solids are desired, the heating step can be continued until the desired product is produced. Temperatures higher than 250° C. can be used although some discoloration which may not be desired may be brought about in curing to the resin. The time for effecting a partial cure or complete cure will be governed, to an extent, on several factors such as the particular polyglycidyl polyether employed, the proportions of divinylbenzene dioxide and polyglycidyl ether used, the inclusion of a modifying quantity of an active organic hardener described hereinafter to the system, the temperature for effecting the degree of cure desired, the use of a catalytic quantity of a catalyst described hereinafter to the system, and other considerations. In general, the time for effecting the complete cure can vary from several minutes, e.g., five minutes, to about several days, e.g., one week, and longer, depending upon the correlation of such factors as noted above.

In forming the curable compositions, the catalyst and/or active hardener is preferably mixed with the epoxide compositions so as to form curable compositions which are homogeneous. It has been observed that the pot-lives of the curable compositions can be controlled to fit various particular needs by varying the relative proportions of divinylbenzene dioxide and polyglycidyl polyether contained in the epoxide compositions employed. Illustratively, epoxide compositions which contain a greater weight percentage of divinylbenzene dioxide have been found to require longer times to gel when mixed with a catalyst or active organic hardener that the corresponding epoxide systems containing a smaller weight percentage of divinylbenzene dioxide.

In forming the curable mixtures from catalysts and epoxide compositions, an advantageous method is to add the catalyst to the composition at the lowest temperature required to form a liquid mixture. Mixing temperatures of 10° to 25° C. have been found to be advantageous. Stirring then can be employed to obtain a homogeneous, curable mixture. If desired, higher temperatures may be employed with, however, the possibility of inducing premature cure and localized curing around catalyst particles prior to the formation of a homogeneous, curable mixture. In most cases it may be desirable to obtain a homogeneous mixture before bringing about any substantial degree of curing and in such instances low mixing temperatures of the order specified above can be employed. Catalyst concentrations and curing temperatures are believed to affect the curing rate, the higher concentrations and temperatures promoting faster cures than the lower ones. Catalyst concentrations can be varied over a broad range and can be selected on the basis of the rate of cure desired and the curing temperature to be used. It has been found, however, that catalyst concentrations from about 0.005 to 25.0 weight percent, based on the weight of epoxide composition, are advantageous in forming valuable thermoset resins from the curable compositions. Although higher concentrations can be employed, no particular advantage is apparent. Preferred catalyst concentrations are within the range of from about 0.005 to about 15.0 weight percent, based on the weight of epoxide composition. The mixtures of epoxide compositions and catalysts can be cured at temperatures up to 250° C. Temperatures over 250° C. may be used when desired, even though discoloration, which may be undesirable, may be caused. Discoloration which may be induced at temperatures over 250° C. can be reduced to a minimum, however, by lowering the catalyst concentration in the curable mixture. In the preferred method of curing, the mixture is brought to a temperature of about 50° C. to 150° C. until a gel, or partially cured solid, is formed. After formation of the gel, the temperature of the mixture is then maintained at an approximate temperature within the range of 100° C. to 200° C. to complete the cure. Although this is a preferred method, other single temperatures or combinations of temperatures, preferably none of which are higher than 250° C. can be used for curing.

In forming the curable mixtures from active organic hardeners and epoxide compositions, it is advantageous to first mix the active organic hardener in liquid form with the epoxide composition in liquid form. When the active organic hardener and epoxide composition are both in the liquid state at temperatures, for example, below about 30° C., they can be simply mixed together at room temperature and stirred to form a homogeneous, curable mixture. Higher temperatures may be used for mixing and in fact can facilitate the mixing, particularly when the active organic hardener or the epoxide composition or both are in the solid state at room temperature. It is preferable to employ mixing temperatures which are elevated just high enough to place both the active organic hardener and epoxide compositions in the liquid states, so as to avoid any substantial degree of premature curing. Inasmuch as premature curing may not be disadvantageous and in fact may be desirable in particular circumstances, temperatures which are higher than those required to place both the active organic hardener and epoxide composition in liquid states can be used. Methods other than the preferred method for preparing curable mixtures from the epoxide compositions and active organic hardeners can be used, if desired. For example, solvents or reactive diluents can be employed to place the active organic hardener and epoxide composition in liquid form below about 30° C., or the active organic hardener or epoxide composition or both can be mixed in other than liquid form, as desired. The relative amounts of active organic hardener and epoxide composition can be varied over a wide range to produce a wide variety of useful products. Temperatures for effecting cures can be varied as desired but those below about 250° C. are preferred. Higher temperatures encourage a faster rate of cure while the lower temperatures effect a slower rate of cure. An advantageous method of curing these curable mixtures is to maintain the mixture at temperatures in the range of 50° C. to 150° C. until a gel, or partially cured solid, is formed. This gel is then maintained at a temperature in the 100° C. to 200° C. range to complete the cure. Other single curing temperatures or combinations of curing temperatures can be used. Catalysts can also be employed to quicken the rate of cure. Higher catalyst concentrations promote faster curing rates than lower concentrations in the same systems under correspondingly similar conditions. Although catalyst concentrations over a wide range may be used, it is preferred to employ them in concentrations of up to 5.0 weight percent, based on the weight of epoxide composition.

Divinylbenzene dioxide, which is employed to effectively reduce the viscosity of the polyglycidyl ethers so that tailor-made viscosity ranges of epoxide compositions are obtainable to fit particular applications while at the same time imparting improved characteristics and properties to the cured resins prepared therefrom, is not a new compound. One preferred method of preparing divinylbenzene dioxide is the reaction of ortho-, meta-, and/or para-divinylbenzene with an excess of peracetic acid solution in an inert solvent such as acetone or ethyl acetate at approximately 70° C., followed by isolation of the diepoxide product by fractional distillation. Other mode of preparing divinylbenzene dioxide are more fully described in the literature.

Polyglycidyl polyethers which can be advantageously used as a component in the epoxide compositions of this invention can be characterized by their epoxy equivalents and melting points, or melting point ranges. By the term "epoxy equivalent," as used herein, is meant the weight of polyglycidyl polyether which contains one mole of epoxy group. The epoxy equivalent can be determined by heating a one gram sample of the polyglycidyl polyether with a pyridine soltuion containing a known quantity of pyridine hydrochloride for about one hour and titrating with sodium hydroxide or potassium hydroxide to determine the amount of unreacted pyridine hydrochloride. From this, the amount of pyridine hydrochloride that has reacted with the epoxy groups of the polyglycidyl polyether can be calculated. From these data the number of grams of polyglycidyl polyether per epoxy group contained thereby, that is, the epoxy equivalent, can be determined by taking one mole of pyridine hydrochloride as equivalent to one mole of epoxy group. Melting point ranges, as used herein, were determined by the Durran's Mercury Method.

Many methods are known in the art for preparing polyglycidyl polyethers. They can be advantageously prepared by the reaction of halohydrins, such as, monohalohydrins, polyhalohydrins, epihalohydrins and the like, with polyhydric phenols. An advantageous method for such a preparation is to heat a dihydric phenol with epichlorohydrin in the presence of sufficient caustic alkali, or other strong aqueous alkali, e.g., potassium hydroxide, to combine with the chlorine of epichlorohydrin. It is preferable to use a stoichiometric excess of alkali so as to insure the complete combination of chlorine. Theoretically, one mole of epichlorohydrin will react with one hydroxyl group of polyhydric phenol to form the polyglycidyl polyether of the phenol. For example, two moles of epichlorohydrin are theoretically required to react with one mole of a dihydric phenol to form the diglycidyl diether of the phenol. In practice, however, a higher ratio than two moles of epichlorohydrin per mole of dihydric phenol is required and up to 10 moles of epichlorohydrin per mole of dihydric phenol has been required in order to form the diglycidyl diether of the phenol. The chain length and extent of polymerization can be varied by changing the mole ratio of epichlorohydrin to dihydric phenol within the range of 10:1 to 1.2:1. Thus, by decreasing the mole ratio of epichlorohydrin to dihydric phenol from 10 towards 1.2, polyglycidyl polyethers having longer chain lengths, higher epoxy equivalents and higher softening points can be obtained. The reaction temperature can be preferably controlled at from 25° C. to 100° C. by regulating the amount of water in the aqueous alkali added or by cooling the walls of the reaction vessel with a circulating cooling medium or by any other suitable cooling means. Towards the end of the reaction the addition of heat may be required to maintain the temperature of the reaction mixture at the desired level within the range from 50° C. to 100° C. The overall reaction time can be made to vary from thirty minutes to three hours or more depending upon the temperature, proportion of reactants and method of mixing the reactants. The polyglycidyl ether product can be recovered from the reaction mixture by methods well recognized in the art.

The lower molecular weight of polyglycidyl polyethers which can be formed as described above can be further polymerized by heating with less than equivalent amounts of the same, or different polyhydric phenol, to form longer chain polyglycidyl polyethers. For example, a diglycidyl diether of a dihydric phenol can be mixed with a less than equivalent amount of the same or different dihydric phenol. In further polymerizing polyhydric phenols and low molecular weight polyglycidyl polyethers formed by the reaction of a halohydrin and a polyhydric phenol, the phenol and epoxide can be mixed and heated with or without a catalyst. By heating the mixture without a catalyst, polymerization takes place but at a slower rate. Catalysts suitable for accelerating the rate of reaction include alkalis and alkaline reacting substances, acids, salts; basic nitrogen compounds, metallic surfaces and the like.

Typical halohydrins which can be used in the preparation of the polyglycidyl polyethers include monohalohydrins, such as, 3-chloro-1,2-propanediol, polyhalohydrins, e.g., glycerol dichlorhydrin, bis(3-chloro-2-hydroxylpropyl)ether, bis(3-chloro-2-methyl-2-hydroxypropyl)ether, 2-methyl-2-hydroxy-1,3-dichloropropane, 1,4-dichloro-2,3-dihydroxybutane, and the like, and epihalohydrins, such as, epichlorohydrin which is preferred. Illustrative of polyhydric phenols which can be used in preparing polyglycidyl polyethers are mononuclear phenols and polynuclear phenols. Typical polyhydric phenols include resorcinol, catechol, hydroquinone, phlorglycinol and the like. Typical polynuclear phenols include p,p'-dihydroxydibenzyl, p,p'-dihydroxyphenyl, p,p'-dihydroxyphenyl sulfone, p,p'-dihydroxybenzophenone, 2,2'-dihydroxy-1,1'-dinaphthylmethane, and the 2,2'; 2,3'; 2,4'; 3,3'; 3,4'; and 4,4' isomers of dihydroxydiphenylmethane, dihydroxydiphenyldimethylmethane, dihydroxydiphenylethylmethylmethane, dihydroxydiphenylmethylpropylmethane, dihydroxydiphenylethylphenylmethane, dihydroxydiphenylpropylphenylmethane, dihydroxydiphenylbutylphenylmethane, dihydroxydiphenyltolylmethane, dihydroxydiphenyltolylmethylmethane, dihydroxydiphenyldicyclohexylmethane, dihydroxydiphenylcyclohexane, polyhydric phenolicformaldehyde condensation products, and the like. Preferred polyglycidyl polyethers are those which contain as reactive groups only epoxy groups and hydroxyl groups. These preferred polyglycidyl polyethers have melting points or melting point ranges of not greater than 160° C.

Suitable catalysts which can be employed in the epoxide compositions of this invention to promote the curing of said compositions to resins include basic and acidic catalysts. Catalysts which are effective include the mineral acids, e.g., sulfuric acid, perchloric acid, phosphoric acid, polyphosphoric acid, and the like; the sulfonic acids, e.g., ethylsulfonic acid, benzenesulfonic acid, toluenesulfonic, lower alkyl-substituted aromatic sulfonic acids, and the like; the metal halide Lewis acids, e.g., boron trifluoride, stannic chloride, zinc chloride, ferric chloride, aluminum chloride, boron trifluoride-piperidine complex, boron trifluoride-monoethylamine complex, boron trifluoride-1,6-hexanediamine complex, boron trifluoride-dimethyl ether complex, boron trifluoride-diethyl ether complex, and the like. Basic catalysts which can also be employed with advantageous effects to increase the cure rate and reduce the gelation period include the alkali metal hydroxides, e.g., sodium hydroxide, potassium hydroxide, and the like; the amines, e.g., alpha-methylbenzyldimethylamine, dimethylethylamine, dimethylaminomethylphenol, 2,4,6-tris(dimethylaminoethyl)phenol, triethylamine, trimethylammonium hydroxide, and the like.

Uniform dispersions of catalyst in the curable compositions of this invention prior to curing have been found to be desirable in order to minimize local curing around catalyst particles. Agitation of the curable compositions as the catalyst is added is sufficient when the catalyst is miscible with the composition. When the two, i.e., catalyst and curable composition, are immiscible, the catalyst can be added as a solution in an organic solvent. Typical solvents for the catalysts include organic ethers, e.g., diethyl ether, propyl ether and the like; organic esters, e.g., methyl acetate, ethyl propionate, and the like; organic ketones, e.g., acetone, cyclohexanone, and the like. In addition, water can be employed as a solvent for the mineral acid and basic catalysts.

The divinylbenzene dioxide-polyglycidyl ether systems of this invention, with or without the inclusion of a catalyst of the type illustrated above, can be reacted with an active organic hardener. By the term "active organic hardener," as used herein, is meant an organic compound which contains two or more groups which are reactive with epoxy groups. The active organic hardeners illustrated hereinafter are employed in a curing amount, that is, an amount which is sufficient to cause the epoxide system containing said active organic hardener(s) to become thermoset resins in accordance with the teachings of the instant specification. Typical groups which are reactive with epoxy groups are active hydrogen groups such as hydroxyl groups, carboxyl groups, amino groups, thiol groups, and the like, and isocyanate groups, isothiocyanate groups, halide atoms of acyl halides, and the like. Oxydicarbonyl groups such as those contained by polycarboxylic acid anhydrides are also reactive with epoxy groups. One oxydicarbonyl group will react with two epoxy groups and, in this connection, polycarboxylic acid anhydrides need only contain one oxidicarbonyl group in order to function as an active organic hardener with the epoxide compositions of this invention. Stated differently, one oxydicarbonyl group of an anhydride is equivalent to two epoxy-reactive groups.

Representative active organic hardeners include polyfunctional amines, polycarboxylic acid, polycarboxylic acid anhydrides, polyols, i.e. polyhydric phenols and polyhydric alcohols, polythiols, polyisocyanates, polythioisocyanates, polyacyl halides, and others.

As active organic hardeners for the epoxide compositions of this invention, polyfunctional amines have been found to be particularly useful. By the term "polyfunctional amine," as used herein, is meant an amine having at least two active amino hydrogen atoms which can be on the same nitrogen atom or different nitrogen atoms. Curable compositions can be formed as previously described from the epoxide compositions and polyfunctional amines at temperatures in the 15° to 25° C. range, and higher, if desired. Although the epoxide compositions can be mixed in various other relative proportions, it has been found that resins having particularly valuable properties, such as those set forth above, can be formed from mixtures containing the epoxide compositions and polyfunctional amines in such relative proportions as provided from 0.2 to 5.0 amino hydrogens of the amine for each epoxy group contained by said epoxide composition. It is preferred, to form resins from curable mixtures containing the epoxide compositions and polyfunctional amines which provide from 0.3 to 3.0 amino hydrogens for each epoxy group.

Acidic or basic catalysts, such as those set forth previously, and alcohol or phenol catalysts, e.g., ethylene glycol, 2,2 - bis(4 - hydroxyphenyl)propane, hexanetriol, resorcinol, and the like, can be added to these curable mixtures to increase the rate of cure, the higher catalyst concentrations effecting faster cure than lower concentrations. Resins formed from curable mixtures containing our epoxide compositions and polyfunctional amines are particularly valuable in that they are infusible, solvent- and chemical-resistant, capable of tenaciously adhering to a variety of materials, hard and flexible. These curable mixtures are particularly useful for applications wherein high temperatures cannot be employed in curing but wherein resins having the advantageous properties set forth above are desired.

Among the polyfunctional amines contemplated as active organic hardeners include the aliphatic amines, aromatic amines, aralkyl amines, cycloaliphatic amines, alkaryl amines, aliphatic polyamines including polyalkylene polyamines, amino-substituted aliphatic alcohols and phenols, polyamides, addition products of polyamines and low molecular weight epoxides containing oxirane oxygen linked to vicinal carbon atoms, and others.

Typical aliphatic amines include methylamine, ethylamine, propylamine, isopropylamine, butylamine, isobutrylamine, 2-ethylhexyamine, 3-propylheptylamine, and the like.

Examples of aromatic amines, aralkyl amines and alkaryl amines include, among others, aniline, o-hydroxyaniline, m-toluidine, 2,3-xylidine, mesidine, benzylamine, phenethylamine, 1-naphthylamine, meta-, ortho-, and para-phenylenediamines, 1,4-naphthalenediamine, 3,4-toluenediamine and the like.

Illustrative cycloaliphatic amines include cyclopentylamine, cyclohexylamine, p-meththane-1,8-diamine and others.

Among the polyamides, i.e., those having an average molecular weight range from about 300 to about 10,000 include condensation products of polycarboxylic acids, in particular, hydrocarbon dicarboxylic acids, such as malonic acid, succinic acid, glutaric acid, adipic acid, dilinoleic acid, and the like, with polyamines, particularly diamines, such as ethylenediamine, propylenediamine, butylenediamine and the like.

The aliphatic polyamines contemplated include ethylenediamine, propylenediamine, butylenediamine, pentylenediamine, hexylenediamine, octylenediamine, nonylenediamine, decylenediamine, and the like. Polyalkylene polyamines such as diethylenetriamine, triethylenetetramine, tetraethylenepentamine, dipropylenetriamine, and the like, are particularly suitable.

The amino-substituted aliphatic alcohols and phenols suitable for use in the present invention are illustrated by 2-aminoethanol, 2-aminopropanol, 3-aminobutanol, 1,3-diamino-2-propanol, 2-aminophenol, 4-aminophenol, 2,3-diaminoxylenol, and the like.

Other illustrations of polyfunctional amines are the addition products of polyamines, in particular, diamines and triamines and epoxides containing oxirane oxygen linked to vicinal carbon atoms, such as ethylene oxide, propylene oxide, butadiene dioxide, diglycidyl ether, epoxidized soybean oil, epoxidized sofflower oil, and polyglycidyl ethers, such as those prepared from polyhydric phenols and epichlorohydrin. Particularly useful polyfunctional amines are the mono- and poly-hydroyalkyl polyalkylene and arylene polyamines which can be prepared by the addition reaction of polyalkylene polyamines, arylene polyamines, and the like, e.g., ethylenediamine, propylenediamine, diethylenetriamine, hexamethylenediamine, triethylenetetramine, tetraethylenepentamine, phenylenediamine, methylenedianiline, xylenediamine, and the like, with ethylene oxide or propylene oxide such that the resulting amine adduct contains two or more active hydrogen atoms attached to either one or more amino nitrogen atoms. This reaction can be conducted under pressure at temperatures of 50° C. or 55° C. to boiling in the absence of solvents or in the presence of water or an alcohol. However, the reaction is more advantageously carried out at temperatures below 40° C. and preferably below 35° C. without pressure. Other polyfunctional amines can be prepared from known procedures by the addition reaction of polyglycidyl polyethers of dihydric phenols and polyamines, in particular, polyalkylene polyamines. Of particular importance in forming these epoxide polyamine adducts are the diglycidyl diethers of dihydric phenols such as for example, the homologues of dihydroxydiphenylmethanes singly or mixed and the dihydroxydiphenyldimethylmethanes singly or mixed. Mixtures of diglycidyl diethers of dihydric phenols can be prepared by reacting epichlorohydrin with a dihydric phenol using a molar excess of epichlorohydrin over the theoretical molar requirement. Substantially pure cuts of the diglycidyl diethers than can be obtained by fractional distillation under reduced pressure, for example. Illustratively, the polyfunctional amine, i.e., the epoxide polyamine adduct, itself can be prepared by mixing the diglycidyl diether of a dihydric phenol with a polyalkylene diamine such as diethylenetriamine, dipropylenetriamine, and the like, bringing to an elevated temperature for example, up to about 200° C. and maintaining at such an elevated temperature for a period of from 4 to 5 hours. Alternatively, as an illustration, polyfunctional amines can be prepared by adding a diglycidyl diether of a dihydric phenol to a polyalkylene polyamine over a period of time, e.g., from about three to four hours, while maintaining the reaction mixture at an elevated temperature, for example, up to about 200° C. and subsequently adding a dihydric phenol.

Examples of still other polyfunctional amines suitably adaptable include, among others, heterocyclic nitrogen compounds such as piperazine, 2,5-dimethylpiperazine, and the like; aminoalkyl-substituted heterocyclic compounds such as N-(aminopropyl)morpholine, N-(aminoethyl)morpholine, and the like; amino-substituted heterocyclic nitrogen compounds such as melamine, 2,4-diamino-6-(aminoethyl)pyrimidine, and the like; dimethylurea, guanidine, p,p'-sulfonyldiamine, 3,9-bis(aminoethyl)spirobimetadioxane, hexahydrobenzamide, and others.

Other polyfunctional amines having a total of at least two active amino hydrogen atoms to the molecule can be advantageously employed in the epoxide compositions of this invention. For example, such polyfunctional amines as mixtures of p,p'-methylenedianiline and m-phenylenediamine, or other mixtures of two or more polyfunctional amines can be used.

Polyfunctional amines formed by the addition of amines to unsaturated compounds such as acrylonitrile, ethyl acrylate, propyl acrylate, butyl crotonate, and the like are also suitable.

Another class of active organic hardeners which can be reacted with the epoxide compositions of this invention, which epoxide compositions may or may not contain an acidic catalyst of the type illustrated above, are the polycarboxylic acids. By the term "polycarboxylic acid," as used herein is meant a compound having two or more carboxylic groups to the molecule. Curable mixtures can be formed from the epoxide compositions and polycarboxylic acids, which mixtures can be cured to produce a wide variety of useful products. These curable mixtures can be formed at temperatures ranging from about 25° to 150° C., and higher, if desired. In an advantageous method, the epoxide composition and polycarboxylic acid are mixed at room temperatures. This mixture is then made homogeneous by stirring or by heating or by both stirring and heating. It has been found that mixtures containing low-melting polycarboxylic acids which are liquids at room temperature can be made homogeneous by stirring only, although warming ten degrees or fifteen degrees centigrade above room temperature aids in forming the homogeneous mixtures. Mixtures containing high-melting polycarboxylic acids which are semi-solids or solids at room temperature can be advantageously made homogeneous by stirring and heating just to the melting point or melting point range of the polycarboxylic acid. Higher temperatures, however, can be used in forming homogeneous curable mixtures, if desired. These curable mixtures can be cured at temperatures from about 25° to 250° C. Temperatures over 250° C. can be used, if desired, but they are not preferred. Lower temperatures encourage slower curing rates than higher temperatures. The rate of cure of these mixtures can be increased by the addition thereto of acidic catalysts, such as those specified hereinabove. Catalyst concentrations of up to 5.0 weight percent based on the weight of epoxide composition have been found to be adequate. However, higher concentrations can be used, if desired. Higher catalyst concentrations promote faster curing rates than lower catalyst concentrations.

While not wishing to be held to any particular theory or mechanics of reaction, it is believed that polycarboxylic acids react with the epoxy groups of the epoxide compositions and aliphatic hydroxyl groups formed by the reaction of epoxy groups with polycarboxylic acids, except when stringent curing conditions, such as, temperatures over about 100° C. or 200° C. and high catalyst concentrations are used during the cure. Under such stringent conditions polycarboxylic acids are believed to also esterify aliphatic hydroxyl groups attached to the polyglycidyl polyether molecules contained by the epoxide compositions forming water and ester linkages connecting the acid and polyglycidyl polyether molecules. This esterification is believed to provide additional cross-linking to the resins produced. Cross-linking is also believed to occur through the reaction of epoxy groups with the hydroxyl groups generated from the epoxy-carboxyl reaction.

Resins formed from curable mixtures containing the epoxide compositions and polycarboxylic acids are resistant to the action of organic solvents, infusible, hard and flexible. Particularly valuable resins can be made from mixtures containing such amounts of our epoxide compositions and polycarboxylic acids as to provide 0.3 to 1.25 carboxyl groups of the acid for each epoxy group contained by the amount of the epoxide composition. It is preferred, however, to make resins from curable mixtures which contain such amounts of polycarboxylic acids and epoxide compositions as to provide 0.3 to 1.0 carboxyl groups of the acid for each epoxy group from the epoxide composition.

Representative polycarboxylic acids include oxalic acid, malonic acid, succinic acid, glutaric acid, adipic acid, pimelic acid, suberic acid, azelaic acid, sebacic acid, alkylsuccinic acids, alkenylsuccinic acids, ethylbutenylsuccinic acid, maleic acid, fumaric acid, itaconic acid, citraconic acid, mesaconic acid, glutaconic acid, ethylidenemalonic acid, isopropylidenemalonic acid, allylmalonic acid, muconic acid, alpha-hydromuconic acid, beta-hydromuconic acid, diglycolic acid, dilactic acid, dithioglycolic acid, 4-amyl-2,5-heptadienedioic acid, 3-hexynedioic acid, 4,6-decadiynedioic acid, 2,4,6,8-decatetraenedioic acid, 1,2-cyclohexanedicarboxylic acid, 1,4-cyclohexanedicarboxylic acid, 2-carboxy-2-methylcyclohexaneacetic acid, phthalic acid, isophthalic acid, terephthalic acid, tetrahydrophthalic acid, tetrachlorphthalic acid, 1,8-naphthalenedicarboxylic acid, 3- carboxycinnamic acid, 1,2-naphthalenedicarboxylic acid, 1,1,5-pentanetricarboxylic acid, 1,2,4-hexanetricarboxylic acid, 2-propyl-1,2,4-pentanetricarboxylic acid, 5-octene-3,3,6-tricarboxylic acid, 1,2,3-propanetricarboxylic acid, 1,2,4 - benzenetricarboxylic acid, 1,3,5-benzenetricarboxylic acid, 3-hexene-2,2,3,4-tetracarboxylic acid, 1,2,3,4-benzenetetracarboxylic acid, 1,2,3,5-benzenetetracarboxylic acid, 1,2,4,5-benzenetetracarboxylic acid, benzenepentacarboxylic acid, benzenehexacarboxylic acid and the like.

Also, as polycarboxylic acids useful in the polymerizable compositions there are included compounds containing ester groups in addition to two or more carboxy groups and which can be aptly termed polycarboxy polyesters of polycarboxylic acids, such as those listed above, or the corresponding anhydrides of said acids, esterified with polyhydric alcohols. Stated in other words, by the term "polycarboxy polyesters," as used herein, is meant polyesters containing two or more carboxy groups per molecule. These polycarboxy polyesters can be prepared by known condensation procedures, employing mole ratios favoring greater than equivalent amounts of polycarboxylic acid, or anhydride. More specifically, the amount of polycarboxylic acid, or anhydride, employed in the esterification reaction should contain more carboxy groups than are required to react with the hydroxyl groups of the amount of polyhydric reactant. Polyhydric alcohols which can be employed in preparing these polycarboxy polyesters include dihydric alcohols, such as ethylene glycol, diethylene glycol, triethylene glycol, tetraethylene glycol, 1,2-propylene glycol, 1,3- propylene glycol, dipropylene glycols, tripropylene glycols, polyoxyethylene glycols, polyoxypropylene glycols, 1,2-butylene glycol, 1,4-butylene glycol, pentane-1,5-diol, pentane-2,4-diol, 2,2-dimethyltrimethylene glycol, hexane-1,4-diol, hexane-1,5-diol, hexane-1,6-diol, hexane-2,5-diol, 3-methylpentane-1,5-diol, 2-methylpentane-2,5-diol, 3-methylpentane-2,5-diol, 2,2-diethylpropane-1,3-diol, 2,2-diethylhexane-1,3-diol, 2,5-dimethylhexane-2,5-diol, octadecane-1,12-diol, 1-butene-3,4-diol, 2-butene-1,4-diol, 2-butyne-1,4-diol, 2,5-dimethyl-3-hexyne-2,5-diol and the like; trihydric alcohols such as glycerol, trimethylolmethane, hexane-1,2,6-triol, 1,1,1-trimethylolpropane, and the like; tetrahydric compounds, such as pentaerythritol, diglycerol, and the like; and higher polyhydric compounds such as pentaglycerol, dipentaerythritol, polyvinyl alcohols and the like. Additional polyhydric alcohols useful in making polycarboxy polyesters can be prepared by the reaction of epoxides, e.g., diglycidyl ethers of 2,2-propane bisphenol, and reactive hydrogen-containing organic compounds, e.g., amines, polycarboxylic acids, polyhydric compounds and the like. In forming the polycarboxy polyesters that can be employed in the compositions of this invention it is preferable to use a dihydric, trihydric or tetrahydric aliphatic or oxaaliphatic alcohol. The mole ratios in which the polycarboxylic acid or anhydride can be reacted with polyhydric alcohols in preparing polycarboxylic polyesters useful in our compositions are those which provide polyesters having more than one carboxy group per molecule. In the case of trifunctional and tetrafunctional reactants in the esterification reaction, the mole ratios of the respective reactants must be such as to avert gelation. The preferred mole ratio ranges of dicarboxylic acid or anhydride to trihydric or tetrahydric alcohols that have been found to provide polycarboxylic polyesters which can be advantageously used in the compositions of this invention are presented in Table I.

TABLE I

| Polyhydric Alcohol | Mole Ratio of Dicarboxylic Acid or Anhydride to Polyhydric Alcohol |
|---|---|
| Trihydric alcohol | 2.2 to 3.0 |
| Tetrahydric alcohol | 3.3 to 4.0 |

It is preferred, however, to employ polycarboxylic polyesters prepared from dicarboxylic acids or anhydrides and polyhydric alcohols in the mole ratios specified in Table II.

TABLE II

| Polyhydric Alcohol | Mole Ratio of Dicarboxylic Acid or Anhydride to Polyhydric Alcohol |
|---|---|
| Trihydric alcohol | 2.5 to 3.0 |
| Tetrahydric alcohol | 3.5 to 4.0 |

These polycarboxy polyesters can be obtained by condensing, in accordance with known procedures, a polyhydric alcohol and a polycarboxylic acid or anhydride. This condensation reaction may be conducted, for example, by heating the reactants to a temperature within the range from 100° C. to 200° C. with or without an acidic catalyst. Water formed by the condensation reaction may be removed by distillation. The course of the reaction may be followed by making acid number determinations and the reaction can be stopped when a suitable polycarboxy polyester has been obtained. As preferred polycarboxylic acids, those which are soluble in divinylbenzene dioxide-polyglycidyl polyether system at a temperature below about 250° C. are advantageously employed.

Curable mixtures containing the epoxide compositions and polycarboxylic acid anhydrides can also be employed to produce resins having diversified and valuable properties. By the term "polycarboxylic acid anhydride," as used herein, is meant an organic compound containing at least one oxydicarbonyl group, i.e.,

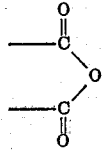

to the molecule. These curable mixtures can be prepared in manners similar to the preparation of curable mixtures of polycarboxylic acids and the epoxide compositions using similar temperature ranges and procedures for obtaining homogeneous mixtures. Acidic or basic catalysts, such as those specified hereinbefore, are effective in increasing the rate of cure of these mixtures. Catalyst concentrations up to about 5.0 weight percent, based on the weight of epoxide composition have been found to be effective in increasing the rate of cure. Higher catalyst concentrations can be employed, if desired, although concentrations of about 5.0 weight percent and below, have been found to be adequate.

While not wishing to be held to any particular theory or mechanics of reaction, it is believed that polycarboxylic acid anhydrides can esterify aliphatic hydroxyl groups which are attached to polyglycidyl polyether molecules contained by the epoxide compositions in addition to reacting with the epoxy groups of said compositions. Additional cross-linking is believed to be developed in the resins by this esterification.

Resins formed from curable mixtures containing polycarboxylic acid anhydrides and our epoxide compositions are infusible, resistant to attack by organic solvents, hard and flexible. Particularly valuable resins can be made from our mixtures containing such amounts of polycarboxylic acid anhydride and epoxide composition as to provide 0.2 to 3.0 carboxy equivalent of the anhydride for each epoxy group of the epoxide composition. It is preferred, however, to make resins from curable mixtures which contain such amounts of polycarboxylic acid anhydride and epoxide composition as to provide 0.4 to 2.0 carboxy equivalent of anhydride for each epoxy group contained by the amount of our epoxide composition.

Typical polycarboxylic acid anhydrides include succinic anhydride, glutaric anhydride, propylsuccinic anhydride, methylbutylsuccinic anhydride, hexylsuccinic anhydride, heptylsuccinic anhydride, pentenylsuccinic anhydride, octenylsuccinic anhydride, nonenylsuccinic anhydride, alpha,beta-diethylsuccinic anhydride, maleic anhydride, chloromaleic anhydride, dichloromaleic anhydride, itaconic anhydride, citraconic anhydride, hexahydrophthalic anhydride, hexachlorphthalic anhydride, tetrahydrophthalic anhydride, methyltetrahydrophthalic anhydride, tetrachlorphthalic anhydride; hexachloroendomethylene-tetrahydrophthalic anhydride, otherwise known as chlorendic anhydride, tetrabromophthalic anhydride, tetraiodophthalic anhydride; phthalic anhydride, 4-nitrophthalic anhydride, 1,2-naphthalic anhydride, 1,8-tetracarboxylic dianhydride; polymeric dicarboxylic acid anhydrides, or mixed polymeric dicarboxylic acid anhydrides such as those prepared by the autocondensation of dicarboxylic acids, for example, adipic acid, pimelic acid, sebacic acid, hexahydroisophthalic acid, terephthalic acid, isophthalic acid, and the like. Also, other dicarboxylic acid anhydrides, useful in our polymerizable compositions include the Diels-Alder adducts of maleic acid and aliphatic compounds having conjugated double bonds. Preferred polycarboxylic acid anhydrides are those which are soluble in divinylbenzene dioxide-polyglycidyl polyether system at temperatures below about 250° C.

Valuable thermoset resins can be prepared from mixtures containing such amounts of the epoxide compositions, i.e., divinylbenzene dioxide-polyglycidyl polyether of a polyhydric phenol system, and polyols as to provide 0.1 to 2.0, preferably from 0.2 to 1.5, hydroxyl groups of the polyol for each epoxy group contained by the amount of the epoxide composition. By the term "polyol," as used herein, is meant an organic compound having at least two hydroxyl groups which are alcoholic hydroxyl groups, phenolic hydroxyl groups, or both alcoholic and phenolic hydroxyl groups. The epoxide composition and polyol can be mixed in any convenient manner. A preferred method, however, is to mix the polyol and epoxide composition in the liquid state so as to obtain a uniform mixture. In forming this mixture it may be necessary to raise the temperature of the polyol and epoxide composition to at least the melting point or melting point range of the highest melting component. Temperatures below about 150° C. are preferred so as to avoid possible premature curing of these curable mixtures. Stirring also aids the formation of a homogeneous mixture. Acidic or basic catalysts, such as those specified hereinbefore, are effective in increasing the rate of cure of these mixtures. Catalyst concentrations up to 5.0 weight percent based on the weight of epoxide composition have been found to be effective in increasing the rate of cure. Higher catalyst concentrations can be used, if desired.

Representative polyols include ethylene glycol, diethylene glycol, polyethylene glycols, propylene glycol, dipropylene glycol, polypropylene glycols, trimethylene glycol, butanediols, pentanediols, 12,13-tetrocosanediol, glycerol, polyglycerols, pentaerythritol, sorbitol, polyvinyl alcohols, cyclohexanediols, inositol, dihydroxytoluenes, resorcinol, catechol, bis(4-hyroxyphenyl)-2,2-propane, bis(4-hydroxyphenyl)methane, and the like.

It is pointed out that valuable resins having special properties can be prepared from the epoxide compositions, i.e., divinylbenzene dioxide-polyglycidyl polyether systems, by incorporating into said compositions two or more active organic hardeners heretofore enumerated. For example, a mixture of polycarboxylic acids or polycarboxylic acid anhydrides or polyols, etc., can be employed as the active organic hardener components. Also, two or more different organic hardeners can be used such as a poly-functional amine and a polyol, or a polycarboxylic acid and a polyol, and so forth.

The epoxide compositions, and curable mixtures and resins made therefrom are useful in the manufacture of a large variety of useful articles such as, combs, brush handles, garden furniture, radio cabinet parts, structural parts, in the potting of electrical parts and the manufacture of protective coatings. The epoxide compositions can be employed as heat and light stabilizers for chlorine-containing resins and can be employed in the manufacture of such condensation resins as phenol-formaldehyde resins, urea-formaldehyde resins, melamine-formaldehyde resins and the like to improve the physical properties, such as flexibility, of such resins. The curable mixtures can be cast or molded using simplified procedures to make numerous articles. These compositions can accept large amounts of a variety of fillers which can impart special properties to resins formed therewith. The curable compositions are also particularly useful in making easily-applied protective coatings and can be cured to hard, durable coatings which are tough, chip resistant and resistant to attack by chemicals and which adhere tenaciously to surfaces of a wide variety of materials including glass and metals. These mixtures are also useful as bonding agents in making adhesives, abrasive wheels, laminates and the like. The resins can be machined and polished to provide articles having various configurations and appealing appearances.

The curable compositions and partially cured compositions (intermediate reaction products that are viscous liquids or thermosetting solids), i.e., divinylbenzene dioxide-polyglycidyl polyether-active organic hardener systems, with or without the use of a catalyst, can be dissolved in a suitable organic solvent such as xylene, methyl isobutyl ketone, butyl acetate, ethyl acetate, toluene, amyl acetate, and the like. The compositions dissolved in the above exemplary list of solvents can be used as, for example, surface coatings which can be subsequently heat cured to hard, tough, scratch-resistant coatings.

The proportion of partially cured resin, i.e., intermediate reaction products, to solvent will depend on various factors such as the particular mixture being cured, the degree or extent of the partial cure, the particular organic solvent employed, and other considerations. In general, a solution comprising from about 10 to about 90 weight percent of the partially cured resin, based on the total weight of partially cured resin and solvent, is suitable; from about 40 to 70 weight percent of the partially cured resin, based on the total weight of partially cured resin and solvent, is preferred. Moreover, the uncured compositions can be dissolved in the solvents exemplified above and applied to surfaces and subsequently heat cured to form hard, tough coatings. Should the solution comprising the uncured composition or partially cured composition tend to "run" when applied to the surface, a conventional wetting agent and/or thixotropic agent can be added to the solution mixture to insure a more uniform coating on the surface.

In the following illustrative example, Barcol hardness values were determined by the use of Barcol Impressor GYZJ-934-1 at a temperature of approximately 25° C.; heat distortion point values of the resins were ascertained in accordance with ASTM method D-648-45T using 264 p.s.i. fiber stress. The divinylbenzene dioxide employed ranged in purity from 60 to 83 weight percent with the impurity substantially being ethylstyrene. The proportions indicated in each example were determined on the basis of the epoxide purity, calculated as diepoxide, as determined by the pyridine hydrochloride method of analysis. Unless otherwise indicated the examination or description of the resins were conducted at room temperature, i.e., approximately 25° C.

EXAMPLES 1–2

There was admixed 18 grams of divinylbenzene dioxide of 60 weight percent purity and 72 grams of diglycidyl diether of bis(4-hydroxyphenyl)-2,2-propane; a viscosity determination with a Brookfield viscometer, model LVF, at 26° C., indicated a viscosity of 1,570 centipoises. The undiluted diglycidyl diether of bis(4-hydroxyphenyl)-2,2-propane had a viscosity of about 19,500 centipoises at 26° C.

Resins were then prepared from the above undiluted and diluted systems by mixing with a polyfunctional amine prepared by condensing 4 mols of diethylenetriamine with one mol of diglycidyl diether of bis(4-hydroxyphenyl)-2,2-propane. The epoxy resin mixture was such as to provide one amino hydrogen group per epoxy group as contained in the diepoxide system. Both the diluted and undiluted systems formed gels within 55 to 70 minutes at room temperature, i.e., approximately 25° C. After curing for one hour at 120° C. plus six hours at 160° C., there were obtained hard, tough resins. The data and properties are listed in Table I below.

*Table I*

| Example No. | Diglycidyl Diether [1] | | Divinyl-benzene dioxide | | Polyfunctional Amine | | Resin Description— Barcol Hardness |
|---|---|---|---|---|---|---|---|
| | Grams | Percent [1] | Grams | Percent [2] | Grams | Percent [2] | |
| 1 | 20 | 62.3 | 5 | 15.6 | 7.1 | 22.1 | 42 |
| 2 | 32.0 | 80.0 | | | 8.0 | 20.0 | 32 |

[1] Diglycidyl diether of bis(4-hydroxyphenyl)-2,2-propane.
[2] Percent by weight, based on the total weight of the system.

It is apparent from the data contained in Table I that divinylbenzene dioxide, even of low purity (60 weight percent), is an effective reactive diluent. It is also apparent that the system containing divinylbenzene dioxide (Example I above), upon curing, yielded a harder resin than the corresponding system lacking the divinylbenzene dioxide component (Example 2 above).

EXAMPLE 3

There was prepared a mixture containing divinylbenzene dioxide (5 grams) of 83 weight percent purity, diglycidyl diether of bis(4-hydroxyphenyl)-2,2-propane (20 grams), and a polyfunctional amine (7.5 grams) prepared by condensing 4 mols of diethylenetriamine with one mol of diglycidyl diether of bis(4-hydroxyphenyl)-2,2-propane. The resulting mixture contained one amino hydrogen group of polyfunctional amine per epoxy group of epoxide contained in the system. This mixture formed a gel within 55 minutes at room temperature. The resulting gel was cured for 7.5 hours at 120° C. plus 6 hours at 160° C. There was obtained a resin having the following properties:

Barcol hardness _____ 49
Heat distortion point, °C _____ 110

EXAMPLES 4–9

Divinylbenzene dioxide of 74 weight percent purity was admixed with diglycidyl diether of bis(4-hydroxyphenyl)-2,2-propane in the proportions shown in Table II below. The viscosities of the resulting mixtures at 26° C. were determined with a Brookfield viscometer, model LVF.

Table II

| Example No. | Divinylbenzene Dioxide | | Diglycidyl Diether [2] | | Viscosity, Centipoises |
|---|---|---|---|---|---|
| | Grams | Percent [1] | Grams | Percent [1] | |
| 4 | 58.8 | 98 | 1.2 | 2 | 18 |
| 5 | 45.0 | 75 | 15.0 | 25 | 50 |
| 6 | 30.0 | 50 | 30.0 | 50 | 180 |
| 7 | 7.5 | 25 | 22.5 | 75 | 1,136 |
| 8 | 0.6 | 2 | 29.4 | 98 | 13,100 |
| 9 | 0 | 0 | 70 | 100 | 14,700 |

[1] Percent by weight, based on the total weight of the system.
[2] Diglycidyl diether of bis(4-hydroxyphenyl)-2,2-propane.

Each of the above mixtures were then mixed with a polyfunctional amine which was prepared by condensing 4 mols of diethylenetriamine with one mole of diglycidyl diether of bis(4-hydroxyphenyl)-2,2-propane. The di-epoxide and polyfunctional amine were present in such proportions as to provide one amino hydrogen group per epoxy group. The resulting mixtures were allowed to stand at room temperature for 2 hours, during which periods of time gelation occurred. All the resins were post cured for 4.5 hours at 120° C. plus 6 hours at 160° C. The data and results are set forth in Table III below.

Table III

| Ex. No. | Divinyl-benzene Dioxide, Grams | Diglycidyl Diether,[1] Grams | Polyfunctional Amine,[2] Grams | Gel Time at 26° C., Minutes | Resin Properties | |
|---|---|---|---|---|---|---|
| | | | | | Barcol Hardness | Heat Distortion Point, °C. |
| 4 | 24.5 | 0.5 | 12.2 | 70 | 46 | |
| 5 | 18.75 | 6.25 | 10.7 | 60 | 50 | |
| 6 | 12.5 | 12.5 | 9.5 | 50 | 49 | 110 |
| 7 | 6.25 | 18.75 | 8.1 | 30 | 45 | 111 |
| 8 | 0.5 | 24.5 | 6.7 | 28 | 40 | 118 |
| 9 | | 25.0 | 6.5 | 31 | 40 | |

[1] Diglycidyl diether of bis(4-hydroxyphenyl)-2,2-propane.
[2] Addition product prepared by condensing four moles of diethylenetriamine with one mol of diglycidyl diether of bis(4-hydroxyphenyl)-2,2-propane.

It will be noted from Table II above the divinylbenzene dioxide effectively reduced the viscosity of diglycidyl diether of bis(4-hydroxyphenyl)-2,2-propane when admixed with the latter epoxide component. It is also pointed out that upon curing the systems set forth in Table III above that those systems containing divinylbenzene dioxide gave a higher Barcol Hardness value than those systems lacking divinylbenzene dioxide (Example 9 above).

EXAMPLES 10–15

Divinylbenzene dioxide of 74 weight percent purity of a polymeric diglycidyl diether of bis(4-hydroxyphenyl)-2,2-propane [1] were admixed in equal quantities. The resulting mixture had a viscosity of 4060 centipoises at room temperature, i.e., about 25° C. The polymeric diglycidyl diether of bis(4-hydroxyphenyl)-2,2-propane was a solid with a melting point of about 70° C., and it was therefore particularly difficult to use with polyfunctional amine hardeners due to the formation of a gel on heating which was required for mixing.

The above resulting epoxide mixture was divided into several equal portions of 1.68 grams; these portions were then admixed with various acidic and basic organic hardeners in the proportions shown in the following table. For comparison a resin was also prepared from 2.5 grams of the above-said polymeric diglycidyl diether of bis(4-hydroxyphenyl)-2,2-propane and the corresponding acidic and basic organic hardeners. The data and results are set forth in Table IV below.

[1] Material obtained from Shell Chemical Corp. under tradename of Epon 1,001; possessed an epoxide equivalent weight range of from 450–525.

Table IV

| Example No. | Diepoxide | Organic Hardener | Grams | Ratio [3] | Gel Time, Minutes | Gel Temperature, °C. | Total Cure, Hours, °C. | Resin Description |
|---|---|---|---|---|---|---|---|---|
| 10 | (1) | Diethylenetriamine | 0.22 | 1.0 | 180 | 26 | 3.5 hrs. at 26°; 1 hr. at 80°; 2.5 hrs. at 120°; 6 hrs. at 160° | Amber, tough, Barcol, 35. |
| 11 | (2) | do | 0.11 | 1.0 | (4) | 80 | 3.5 hrs. at 26°; 1 hr. at 80°; 2.5 hrs. at 120°; 6 hrs. at 160° | Amber, tough. |
| 12 | (1) | Methylenedianiline | 0.50 | 1.0 | 20 | 120 | 4.5 hrs. at 120°; 6 hrs. at 160° | Pale amber, tough, Barcol, 34. |
| 13 | (2) | do | 0.25 | 1.0 | 11 | 120 | 4.5 hrs. at 120°; 6 hrs. at 160° | Yellow, tough, Barcol, 30. |
| 14 | (1) | Phthalic anhydride | 1.11 | 1.5 | 120 | 120 | 5.5 hrs. at 120°; 6 hrs. at 160° | Pale amber, tough, Barcol, 38. |
| 15 | (2) | do | 0.56 | 1.5 | 270 | 120 | 5.5 hrs. at 120°; 6 hrs. at 160° | Yellow, tough, Barcol, 35. |

[1] Divinylbenzene dioxide-polymeric diglycidyl diether of bis(4-hydroxyphenyl)-2,2-propane system; 50 weight percent of diglycidyl ether and 50 weight percent of divinylbenzene dioxide (74 weight percent purity) contained in epoxide system.
[2] Polymeric diglycidyl diether of bis(4-hydroxyphenyl)-2,2-propane.
[3] In the case of polyfunctional amines, ratio is expressed as one amino hydrogen group per epoxy group of the epoxide system; in the case of phthalic anhydride, the ratio is expressed as 1.5 carboxyl groups per epoxy group of the epoxide system.
[4] On heating.

It is evident from the data set forth in Table IV above that the use of divinylbenzene dioxide as a reactive diluent for polymeric diglycidyl diether of bis (4-hydroxyphenyl)-2,2-propane results in the following advantages: (1) Low viscosity, therefore allowing the formation of bubble-free castings. (2) Generally, better control of the rate of gelation. That is, with polyfunctional amines lower temperatures can be used, and in the case of anhydrides the use of divinylbenzene dioxide gives a faster reaction. (3) The resins containing divinylbenzene dioxide were harder than those obtained from the undiluted systems as is evident of a comparison of the Barcol Hardness values.

EXAMPLES 16–27

A mixture containing 50 weight percent of divinylbenzene dioxide (74 weight percent purity) and 50 weight percent of diglycidyl diether of bis(4-hydroxyphenyl)-2,2-propane was prepared. The resulting mixture was divided into equal portions containing 1.2 grams each and to each portion there were added various organic hardeners. In the case of the polyfunctional amine hardeners the mixtures contained one amino hydrogen group of polyfunctional amine per peoxy group of epoxide mixture. In the case of the anhydride hardeners, the resulting mixtures contained 1.5 carboxyl groups of anhydride per epoxy group of epoxide mixture. Comparative runs were conducted from curable mixtures containing diglycidyl diether of bis(4-hydroxyphenyl)-2,2-propane (1.9 grams) and the corresponding organic hardener. The data and results are set forth in Table V below.

erally, better control of the rate of gelation. That is, with polyfunctional amine hardeners a slower reaction rate was observed and in the case of anhydrides a faster rate of reaction was observed. (3) Those systems containing divinylbenzene dioxide gave resins which were harder than the resins obtained from the corresponding systems lacking divinylbenzene dioxide.

EXAMPLES 28–30

A mixture was prepared from 30 grams of divinylbenzene dioxide of 74 weight percent purity and 30 grams of polymeric diglycidyl diether of bis(4-hydroxyphenyl)-2,2-propane,[1] having a melting point[2] of 145° and 155° C. and an epoxide equivalent weight of 2,400 to 4,000. The resulting mixture was extremely viscous (above 70,000 centipoises) at room temperature but readily mixed with organic hardeners, indicated below, at 80° to 120° C. The resulting mixture was divided into several equal portions containing 1.95 grams, and then each portion was admixed with a polyfunctional amine in the proportion of one amino hydrogen group per epoxy group of epoxide mixture, and with phthalic anhydride in the proportion of 1.5 carboxyl groups per epoxy group of epoxide mixture. Efforts to prepare resins from the undiluted polymeric diglycidyl diether of bis(4-hydroxyphenyl)-2,2-propane were unsuccessful due to the high softening point of the diepoxide. The data and results are set forth in Table VI below.

Table V

| Example No. | Mixture or Control | Hardener | Grams | Gel Time Minutes | Gel Time °C. | Cure Hours, °C. | Resin Description |
|---|---|---|---|---|---|---|---|
| 16 | M[1] | Ethylenediamine | 0.15 | 150 | 26 | 3 hrs. at 26°; 2 hrs. at 80°; 2 hrs. at 120°; 6 hrs. at 160° | Amber, tough, Barcol, 51. |
| 17 | C[2] | ---do--- | 0.15 | 35 | 26 | 3 hrs. at 26°; 2 hrs. at 80°; 2 hrs. at 120°; 6 hrs. at 160° | Yellow, tough, Barcol, 25. |
| 18 | M | 1,6-hexanediamine | 0.29 | 55 | 26 | 3 hrs. at 26°; 2 hrs. at 80°; 2 hrs. at 120°; 6 hrs. at 160° | Amber, tough, Barcol, 35. |
| 19 | C | ---do--- | 0.29 | 30 | 26 | 3 hrs. at 26°; 2 hrs. at 80°; 2 hrs. at 120°; 6 hrs. at 160° | Yellow, tough, Barcol, 25. |
| 20 | M | m-Xylylenediamine | 0.34 | 2.5, 26 plus 50, 80 | | 2.5 hrs. at 26°; 2 hrs. at 80°; 2 hrs. at 120°; 6 hrs. at 160° | Yellow, tough, Barcol, 49. |
| 21 | C | ---do--- | 0.34 | 115 | 26 | 2.5 hrs. at 26°; 2 hrs. at 80°; 2 hrs. at 120°; 6 hrs. at 160° | Yellow, tough, Barcol, 35. |
| 22 | M | Phthalic anhydride | 1.11 | 20 | 120 | 5 hrs. at 120°; 6 hrs. at 160° | Yellow, tough, Barcol, 49. |
| 23 | C | ---do--- | 1.11 | 120–180 | 120 | 5 hrs. at 120°; 6 hrs. at 160° | Yellow, tough, Barcol, 35. |
| 24 | M | Tetrahydrophthalic anhydride | 1.14 | 95 | 120 | 4.5 hrs. at 120°; 6 hrs. at 160° | Yellow, tough, Barcol, 43. |
| 25 | C | ---do--- | 1.14 | 300–360 | 120 | 11 hrs. at 120°; 8 hrs. at 160° | Yellow, tough, Barcol, 33. |
| 26 | M | Chlorendic anhydride | 2.78 | 1 | 120 | 4.5 hrs. at 120°; 6 hrs. at 160° | Yellow, tough, Barcol, 48. |
| 27 | C | ---do--- | 2.78 | 5 | 120 | 4.5 hrs. at 120°; 6 hrs. at 160° | Colorless, tough, Barcol, 43. |

[1] The letter "M" designates an epoxide system containing 50 weight percent (74 weight percent purity) of divinylbenzene dioxide and 50 weight percent of diglycidyl diether of bis(4-hydroxyphenyl)-2,2-propane.

[2] The letter "C" designates an epoxide system containing diglycidyl diether of bis(4-hydroxyphenyl)-2,2-propane. In these instances "C" is a comparative run.

It is evident from the above data that the use of divinylbenzene dioxide as a reactive diluent for diglycidyl diether of bis(4-hydroxyphenyl)-2,2-propane results in the following advantages: (1) Low viscosity, therefor allowing the formation of bubble-free castings. (2) Gen-

[1] Material obtained from Shell Chemical Corp. under tradename of Epon 1,009; possessed an epoxide equivalent weight range of from 2,400–4,000.
[2] Durrans' Mercury Method.

Table VI

| Example No. | Organic Hardener | Grams | Gel Time Minutes | Gel Time °C. | Cure Hours, °C. | Resin Description |
|---|---|---|---|---|---|---|
| 28 | Diethylenetriamine | 0.22 | 10 | 80 | 1.5 hrs. at 80°<br>1.5 hrs. at 120°<br>6 hrs. at 160° | Amber, tough, Barcol, 31. |
| 29 | p,p'-methylene dianiline | 0.5 | 10 | 120 | 2.5 hrs. at 120°<br>6 hrs. at 160° | Yellow, tough, Barcol, 42. |
| 30 | Phthalic anhydride | 1.11 | 1 | 120 | 2.5 hrs. at 120°<br>6 hrs. at 160° | Amber, tough, Barcol, 37. |

EXAMPLE 31

Divinylbenzene dioxide (0.6 gram) of 83 weight percent purity, diglycidyl diether of bis(4-hydroxyphenyl)-2,2-propane (0.6 gram), and diethylenetriamine (0.2 gram) were admixed in the proportion of one amino hydrogen group per one epoxide group. The resulting mixture was allowed to react at room temperature for one hour during which period of time the mixture became highly viscous. This viscous mixture was subsequently dissolved in 5.0 grams of methyl isobutyl ketone. An iron panel or strip was then coated with the resulting solution via brushing. The coated panel was allowed to air dry for 20 minutes and then baked for 15 minutes at 160° C. The resulting coating on the panel was clear, glossy, and tough. The coating displayed excellent adhesion and excellent acetone resistance. Efforts to scratch the coating, by hand, with a 9H Double Eagle pencil were futile.

Reasonable variations and modifications of this invention can be made or carried out in the light of the above disclosure without departing from the spirit and scope thereof.

What is claimed is:

1. A hard, solid resin obtained by the reaction of an epoxide composition comprised of a polyglycidyl polyether of a polyhydric phenol and from about 2 to 98 weight percent of divinylbenzene dioxide, based on the total weight of the above described epoxide components, and a catalyst selected from the group consisting of mineral acids, sulfonic acids, metal halide Lewis acids, alkali metal hydroxides, and tertiary amines.

2. A hard, solid resin obtained by the reaction of an epoxide composition comprised of a polyglycidyl polyether of a polyhydric phenol and from about 2 to 98 weight percent of divinylbenzene dioxide, based on the total weight of the above described epoxide components, and a curing amount of an active organic hardener selected from the group consisting of polyfunctional amines, polycarboxylic acids, polycarboxylic acid anhydrides, and polyols.

3. A hard, solid resin obtained by the reaction of an epoxide composition comprised of a polyglycidyl polyether of a polyhydric phenol from about 10 to about 90 weight percent of divinylbenzene dioxide, based on the total weight of the above described epoxide components, and a polyfunctional amine in such proportions as to provide 0.2 to 5.0 amino hydrogen atoms of said polyfunctional amine for each epoxy group of said epoxide composition.

4. A hard, solid resin obtained by the reaction of an epoxide composition comprised of a polyglycidyl polyether of a polyhydric phenol from about 10 to about 90 weight percent of divinylbenzene dioxide, based on the total weight of the above described epoxide components, and a polycarboxylic acid in such proportions so as to provide 0.3 to 1.25 carboxy groups of said polycarboxylic acid for each epoxy group of said epoxide composition.

5. A hard, solid resin obtained by the reaction of an epoxide composition comprised of a polyglycidyl polyether of a polyhydric phenol from about 10 to about 90 weight percent of divinylbenzene dioxide, based on the total weight of the above described epoxide components, and a polycarboxylic acid anhydride in such proportions so as to provide 0.2 to 3.0 carboxy groups for each epoxy group of said epoxide composition.

6. A hard, solid resin obtained by the reaction of an epoxide composition comprised of a polyglycidyl polyether of a polyhydric phenol from about 10 to about 90 weight percent of divinylbenzene dioxide, based on the total weight of the above described epoxide components, and a polyol in such proportions so as to provide from 0.1 to 2.0 hydroxyl groups for each epoxy group of said epoxide composition.

7. A hard, solid resin obtained by the reaction of an epoxide composition comprised of a polyglycidyl polyether of a polyhydric phenol and from about 2 to 98 weight percent of divinylbenzene dioxide, based on the total weight of the above described epoxide components, and a curing amount of a polyfunctional amine prepared by condensing diethylenetriamine with diglycidyl diether of bis(4-hydroxyphenyl)-2,2-propane.

8. A hard, solid resin obtained by the reaction of an epoxide composition comprised of a polyglycidyl polyether of a polyhydric phenol and from about 2 to 98 weight percent of divinylbenzene dioxide, based on the total weight of the above described epoxide components, and a curing amount of phthalic anhydride.

9. A hard, solid resin obtained by the reaction of an epoxide composition comprised of a polyglycidyl polyether of a polyhydric phenol and from about 2 to 98 weight percent of divinylbenzene dioxide, based on the total weight of the above described epoxide components, and a curing amount of chlorendic anhydride.

10. Thermosetting intermediate reaction products resulting from the partial reaction of a composition comprising a polyglycidyl polyether of a polyhydric phenol, from about 2 to about 98 weight percent of divinylbenzene dioxide, based on the total weight of the above described epoxide components, and a curing amount of an active organic hardener selected from the group consisting of polyfunctional amines, polycarboxylic acids, polycarboxylic acid anhydrides, and polyols, said intermediate reaction products being dissolved in an organic solvent, the resulting solution comprising from about 10 to 90 weight percent of said intermediate reaction products, based on the total weight of said intermediate reaction products and said organic solvent.

References Cited in the file of this patent

UNITED STATES PATENTS 2,849,416 Bender et al. _____ Aug. 26, 1958
2,857,362 Shepard et al. _____ Oct. 21, 1958

UNITED STATES PATENT OFFICE
CERTIFICATE OF CORRECTION

Patent No. 2,982,752　　　　　　　　　　　　　　May 2, 1961

Benjamin Phillips et al.

It is hereby certified that error appears in the above numbered patent requiring correction and that the said Letters Patent should read as corrected below.

Column 7, line 3, for "mode" read -- modes --; column 9, line 21, for "oxidicarbonyl" read -- oxydicarbonyl --; column 10, lines 1 and 2, for "isobutrylamine" read -- isobutylamine --; line 2, for "2-ethylhexyamine" read -- 2-ethylhexylamine --; line 11, for "p-meththane" read -- p-methane --; lines 41 and 42, for "poly-hydroyalkyl" read -- poly-hydroxyalkyl --.

Signed and sealed this 3rd day of October 1961.

(SEAL)
Attest:

ERNEST W. SWIDER
Attesting Officer

DAVID L. LADD
Commissioner of Patents
USCOMM-DC